No. 737,150. PATENTED AUG. 25, 1903.
A. L. ROSMANN & F. BARTHOLD.
BOTTLE WASHING MACHINE.
APPLICATION FILED DEC. 26, 1902.
NO MODEL. 7 SHEETS—SHEET 2.

No. 737,150. PATENTED AUG. 25, 1903.
A. L. ROSMANN & F. BARTHOLD.
BOTTLE WASHING MACHINE.
APPLICATION FILED DEC. 26, 1902.
NO MODEL. 7 SHEETS—SHEET 6.

No. 737,150. PATENTED AUG. 25, 1903.
A. L. ROSMANN & F. BARTHOLD.
BOTTLE WASHING MACHINE.
APPLICATION FILED DEC. 26, 1902.
NO MODEL. 7 SHEETS—SHEET 7.

No. 737,150. Patented August 25, 1903.

UNITED STATES PATENT OFFICE.

ALOIS L. ROSMANN AND FERDINAND BARTHOLD, OF MILWAUKEE, WISCONSIN.

BOTTLE-WASHING MACHINE.

SPECIFICATION forming part of Letters Patent No. 737,150, dated August 25, 1903.

Application filed December 26, 1902. Serial No. 136,688. (No model.)

*To all whom it may concern:*

Be it known that we, ALOIS L. ROSMANN and FERDINAND BARTHOLD, both citizens of the United States, and residents of Milwaukee, in the county of Milwaukee and State of Wisconsin, have invented certain new and useful Improvements in Bottle-Washing Machines; and we do hereby declare that the following is a full, clear, and exact description thereof.

Our invention has for its object to provide simple, durable, and effective machines by which to economically clean the inside and outside of bottles at one operation, the organization of the machines being such that they may be set to receive the bottles as they fall from conveyers employed to elevate them out of soak-tanks, the organization of the machines being such that the bottles fed thereto are automatically caught, held, and released.

Hence said invention consists in certain peculiarities of construction and combination of parts hereinafter particularly set forth with reference to the accompanying drawings and subsequently claimed.

Figure 1:
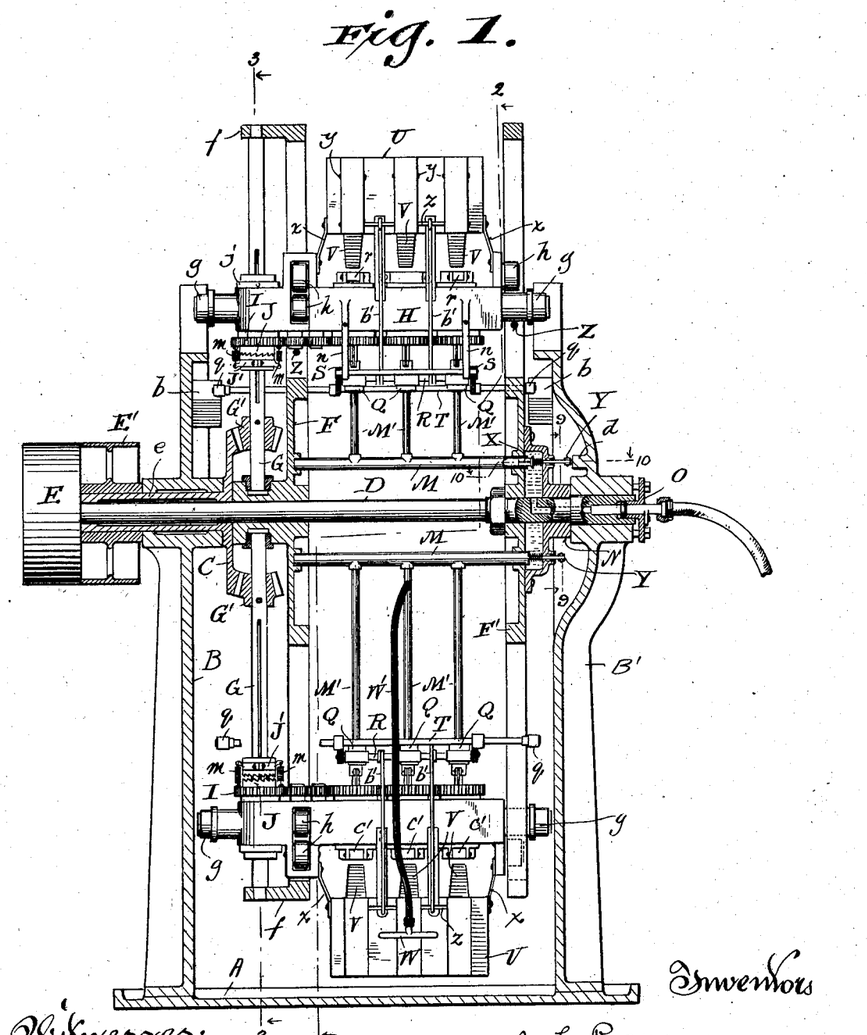
Figure 1 of the drawings represents a partly-sectional front elevation of a bottle-washing machine made in accordance with our invention.
Figure 2:
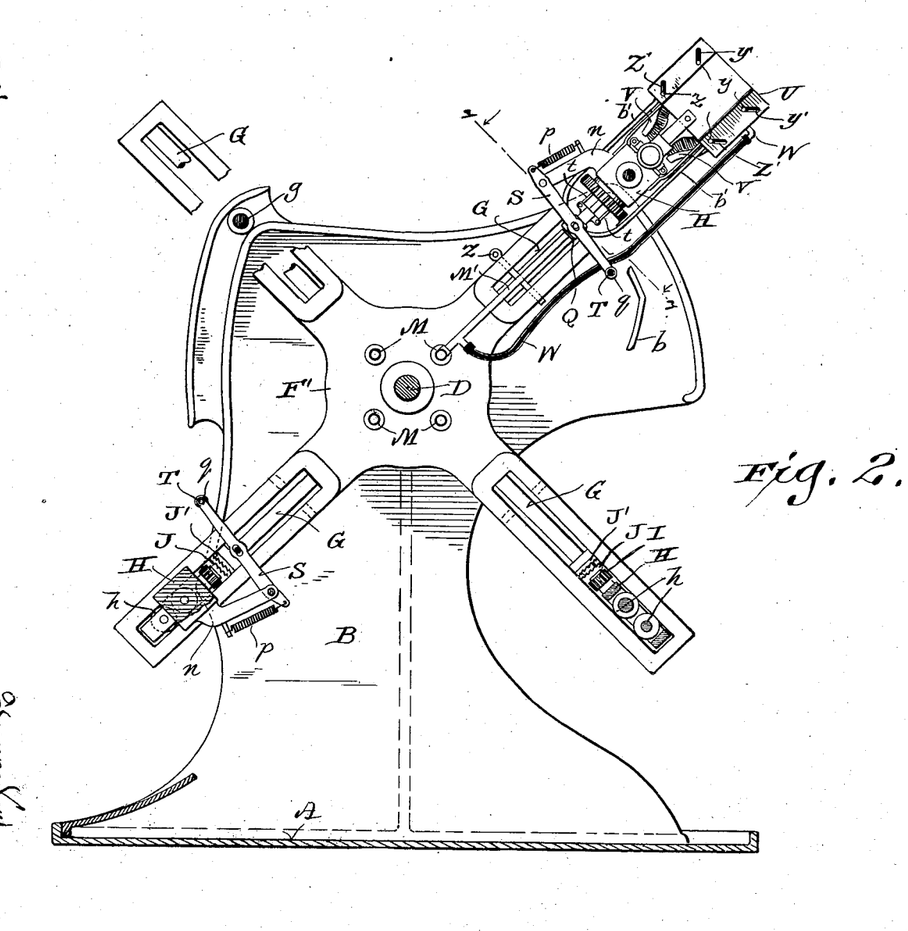
Figs. 2 and 3 sectional views of the machine, these views being respectively indicated by lines 2 2 and 3 3 in the first figure.
Figures 4, 5, 6:
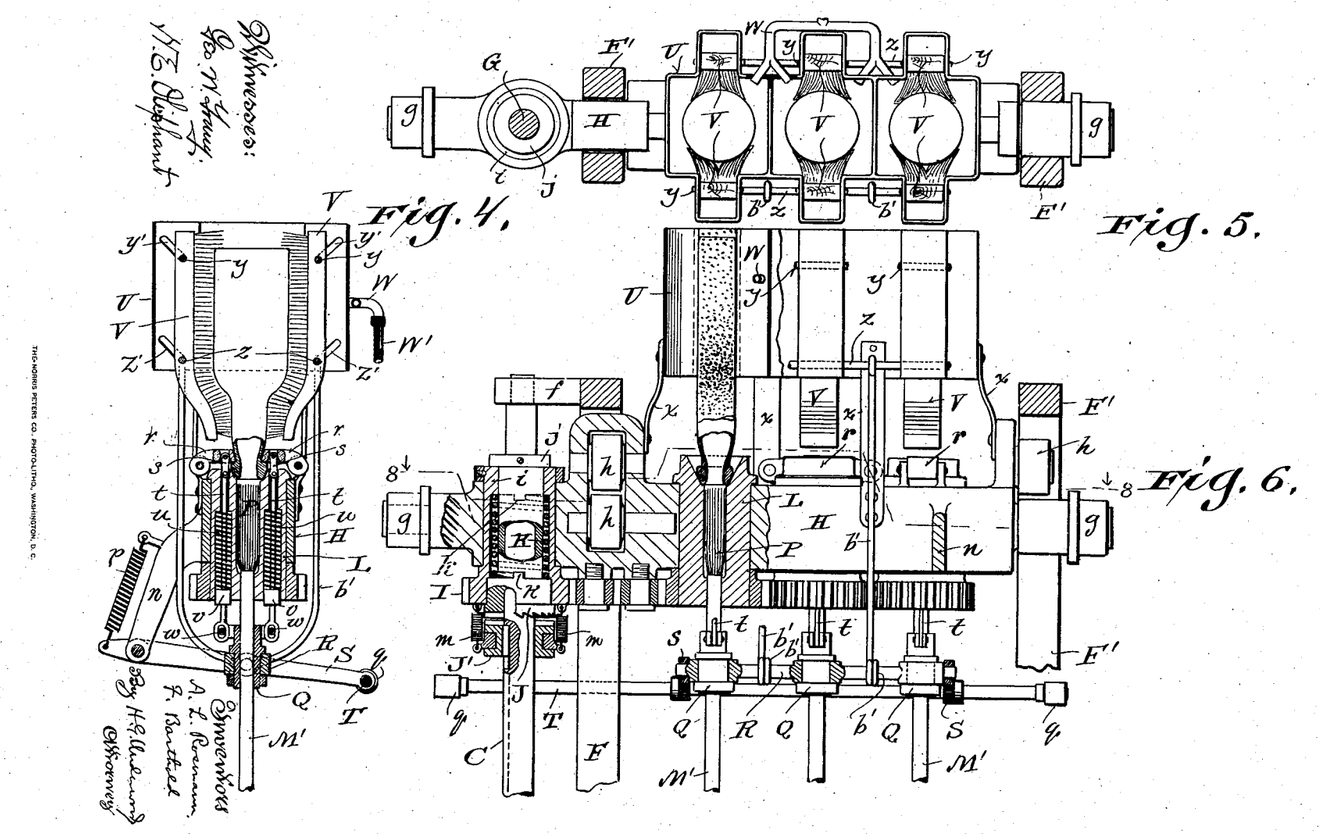
Figs. 4, 5, and 6, partly sectional views of fragments of said machine.
Figures 7, 8:
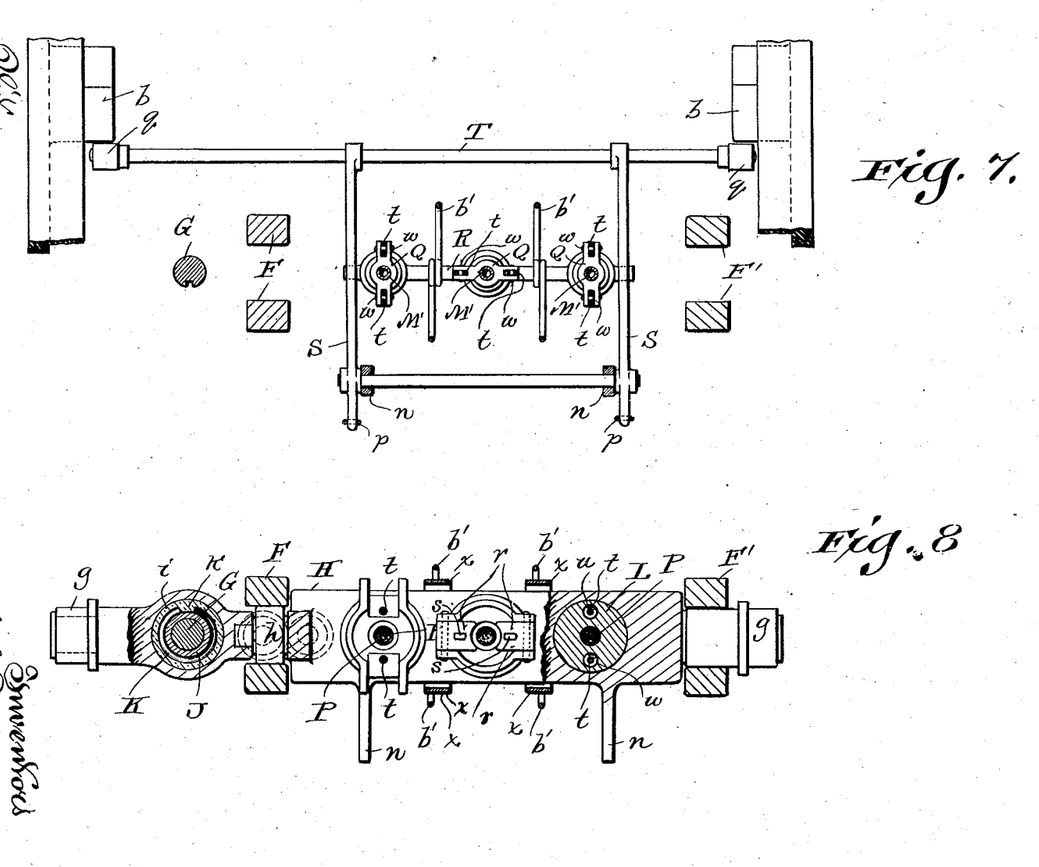
Fig. 7, a detail section view, indicated by line 7 7 in the second figure.
Fig. 8, a similar view indicated by line 8 8 in the sixth figure.
Figure 9:
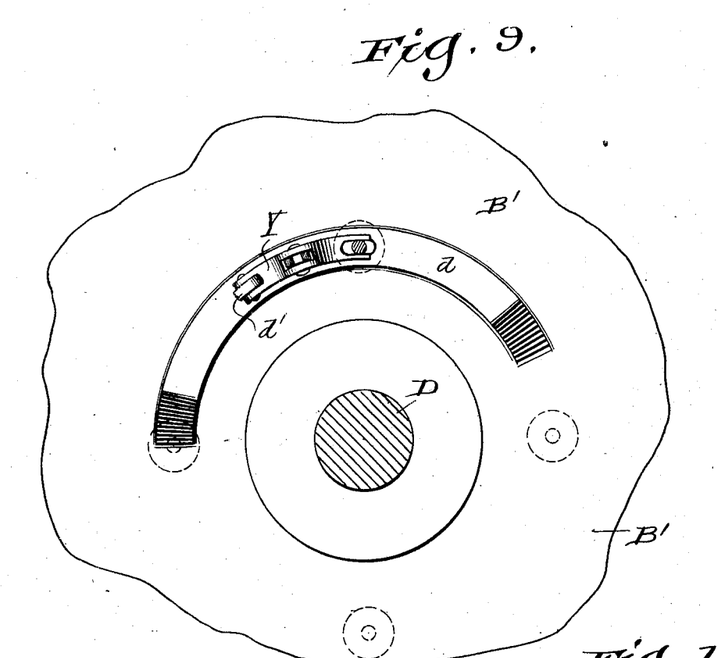
Figs. 9 and 10, detail partly-sectional views, respectively indicated by lines 9 9 and 10 10 in the first figure.
Figure 10:
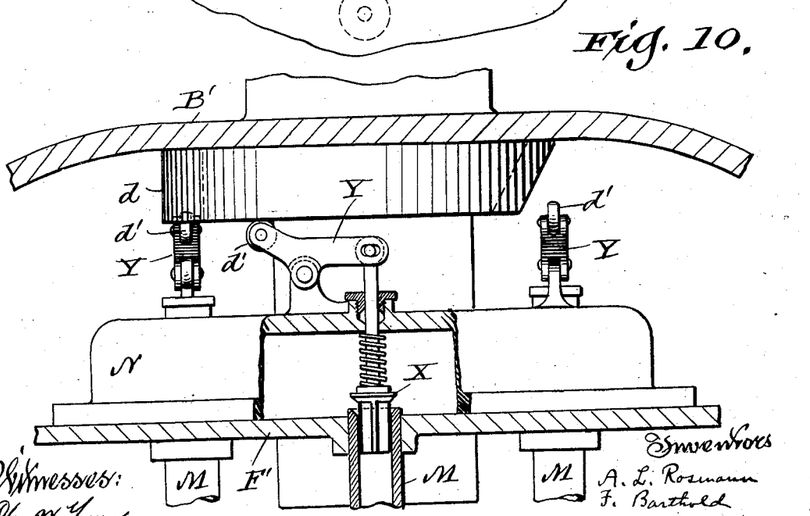

Referring by letter to the drawings, A indicates a base, and B B' a pair of standards mounted on the base to therewith constitute the frame of our machine. The standards are contoured to serve as cams, and each of them is provided with inner flanges $b$ $c$, that are also contoured to serve as cams. In addition to the cam-flanges $b$ $c$ the standard B' is provided with another cam-flange $d$ upon its inner side. Standard B is provided with a bearing for an extended hub $e$ of a bevel gear-wheel C, and this hub is a bearing for a shaft D, that also engages a bearing with which the standard B' is provided. Fast on the shaft is a drive-pulley E, and a similar pulley E' is fast on hub $e$ of the gear-wheel C, it being intended that said pulleys shall be driven by separate belts at different speeds, preferably in opposite directions, the one driving-pulley E' to have the highest speed. A pair of spiders F F' are also fast on shaft D, and the radial arms of the spiders, equidistant apart, are longitudinally slotted, those of one spider being parallel to those of the other. A series of spindles G have their bearings in the hub and lateral outer end flanges $f$ of the arms of spider F, and fast on these spindles are bevel gear-pinions G', that mesh with the bevel gear-wheel C aforesaid. Engaging the longitudinal slots of each pair of parallel spider-arms are stud ends of a cross-head H, and these ends of the cross-head carry antifriction-rollers $g$, that travel the cam contour of the machine-standards, there being automatic reciprocation of the cross-head, the movement being steadied and facilitated by other antifriction-rollers $h$, with which said cross-head is provided in the arrangement shown in Figs. 1 and 6. Each cross-head is made to provide a bearing for an extended hub $i$ of a hollow spur-wheel I, this hub being a sleeve provided with a shoulder and collar that respectively oppose the inner and outer faces of said cross-head, as is best shown in Fig. 6.

Loose on a spindle G, partly within spur-wheel I, is a clutch member J, the hub of which extends outward through that of the sleeve-hub of said spur-wheel and is provided with a stop-collar $j$, opposing the same. Surrounding the clutch-member hub within the spur-wheel sleeve-hub is a spiral spring K, the ends of which abut lugs $k$ of said hubs. In Fig. 6 the clutch-hub lug is shown by full lines and the sleeve-hub lug by dotted lines. Opposing clutch member J is another clutch member J' on the spindle G, and a groove longitudinally of this spindle is engaged by a feather of the latter clutch member. Diametrically opposite spiral springs $m$ are connected at their ends to ears of the opposing clutch members, and when the corresponding cross-head has outward movement there is automatic separation of said clutch members against resistance of said springs, the feather of clutch member J' being caught against the outer end of the spindle-groove with which it is engaged, and when there is reëngagement of the aforesaid clutch members the spiral spring K operates as an automatic resistance to sudden starting of spur-wheel I at high speed.

Held to rotate in each cross-head are centrally-apertured cylindrical blocks L, the outer ends of which are conically recessed to form seats for neck extremities of bottles, and the inner ends of the blocks are put in spur-gear train with the wheel I, that derives its motion by automatic clutch connection with one of the spindles G aforesaid. The blocks L with each cross-head are loose on branches M', that extend outward at right angles from horizontal pipes M in connection with the spiders F F', and a valve-controlled end of each pipe has communication with a water-chamber between spider F' and a shell N, fast thereto on shaft D, this shaft being provided with an end channel open to the water-chamber. A hose connection O, made fast to standard B', has stuffing-box connection with the channel end of shaft D, and a brush-tip P, in connection with each pipe branch M', is normally compressed in the central aperture of a block L, the corresponding cross-head being then at its outer limit of travel. Collared sleeves Q are also guided on the pipe branches M' and between its collars. Each sleeve engages an eye of a yoke R, connected at its ends with rod-connected levers S, for which the corresponding cross-head is provided with fulcrum-arms $n$, spiral springs $p$ being employed to connect lugs of these arms with fulcrum ends of the levers, a rod T being in connection with the other ends of said levers and provided with antifriction-rollers $q$, that turn on the cam-flanges $b$ $c$ of the machine-standards.

In pivotal connection with the conical seat and of each block L are jaws $r$, connected by links $s$ with rods $t$, that extend through said block, and spiral springs $u$, arranged therein between shoulders of the same, and buttons $v$, fast on said rods, the inner ends of these rods being provided with longitudinal slots engaged by pins $w$ in connection with ears on the upper part of the sleeves Q aforesaid. The springs $u$ are under compression against the rod-buttons $v$, and the jaws are normally held in gripping position; but release movement of said jaws results when there is tilt of levers S against resistance of said springs. Owing to the slots in the inner ends of rods $t$ the jaws $r$ automatically accommodate themselves to slight irregularities of length in bottle-neck shoulder enlargements, against which they clamp without draft on the yoke-connected lever-controlled sleeves Q, above specified.

Made fast to each reciprocative cross-head H are arms $x$ of a frame U, partitioned to form compartments that aline with the rotatory blocks L, carried by said cross-head, and contained in each compartment are brushes V, that operate upon the exterior of bottles caught in the machine. Ears $y$ of the brushes V and rods $z$, connecting these brushes in series, are guided in diagonal slots $y'$ $z'$ of the frame U, the rods being connected by links $b'$ with the yokes R aforesaid.

In branch connection with each compartment of frame U is a pipe W, connected by a hose W' with a nipple of one of a series of the pipe branches M', above set forth. The flow of water under pressure to the brushes P V is regulated by automatic operation of valves X, controlling the inlet ends of pipes M, the stems of these valves being in connection with levers Y, fulcrumed on the shell N and provided with antifriction-rollers $d'$, that travel on the cam-flange $d$ of the standard B', said valves being unseated against resistance of spiral springs surrounding their stems in opposition to the inner side of said shell.

The reciprocation of the cross-heads of the machine is due to gravity and cam contour of standards B B' when the spiders F F' are rotated, and in successive order they are for a time held at the full limit of their outward movement by a portion of the contour of said standards, the clutch members J J' relative to each cross-head and spindle G being then separated to prevent rotary motion of the geared blocks L, having end seats for neck extremities of bottles, while at the same time the cam-flanges $b$ of the standards cause an operation of the levers S against resistance of springs $p$ $u$ to move brushes V and jaws $r$ in the direction necessary to afford clearance for the positioning of bottles, mouth in, against said blocks. As the spiders continue their revolution in the direction of the dotted arrow-line in Fig. 3 the cam-flanges $b$ of the machine-standards are passed by the rod T in connection with levers S, and reaction of springs $p$ $u$ causes a grip of jaws $r$ on the bottles back of the shoulder enlargements of their necks, the corresponding brushes V being simultaneously moved into contact with the exterior of said bottles. About the time this operation is completed the cross-head, following the cam contour of the machine-standards, starts on inward movement, and the blocks L, to which the bottles are gripped, are automatically started in rotatory motion, due to reëngagement of the previously-separated clutch members. As the cross-head moves inward the whirling bottles therewith are entered by brushes P, each of which expand to come into contact with the entire interior of a bottle, the exterior of which is for the time being in contact with brushes V, as above specified. In the meantime the levers Y are operated by means of the cam-flange $d$ of standard B' to unseat a valve X against spring resistance, whereby water under pressure is supplied to the bottles and brushes. Continued travel of the cross-head results in automatically seating of valve X, as well as automatic discharge of the washed bottles, the antifriction-rollers of rod T, having travel on cam-flanges $c$ of standards B B' to cause retraction of the brushes V and jaws $r$ aforesaid.

Figure 3:
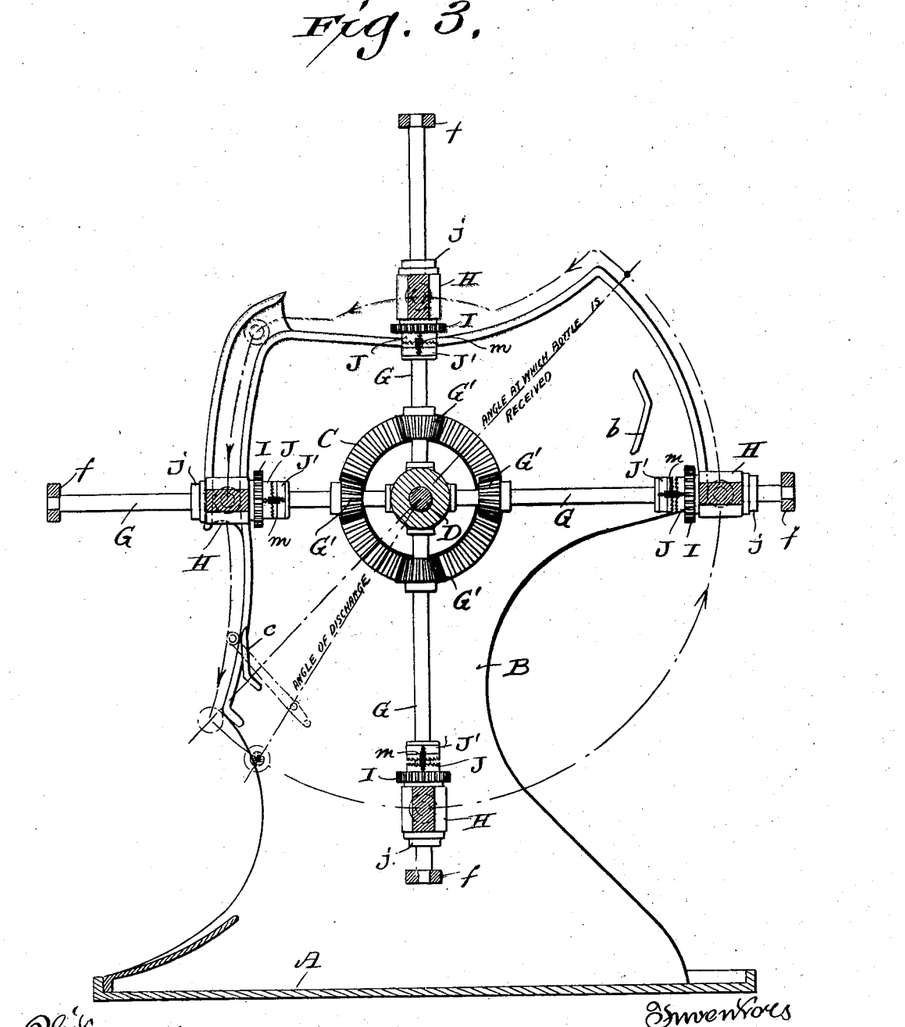

Pint-bottles being shorter than quart bottles, inward movement of the cross-heads must be limited when said shorter bottles are engaged by the brushes P; otherwise these brushes will be damaged, and to prevent full inward movement of said cross-heads stop-pins Z are shown in connection with the spider-arms crossing the slots in same. In Fig. 3 the upper dotted-line arc illustrates part of the travel of the cross-heads when the machine is being utilized to wash pint-bottles; but when quart-bottles are being washed said cross-heads are permitted to follow the full contour of the cam-standards B B' opposed thereto.

Figure 11:
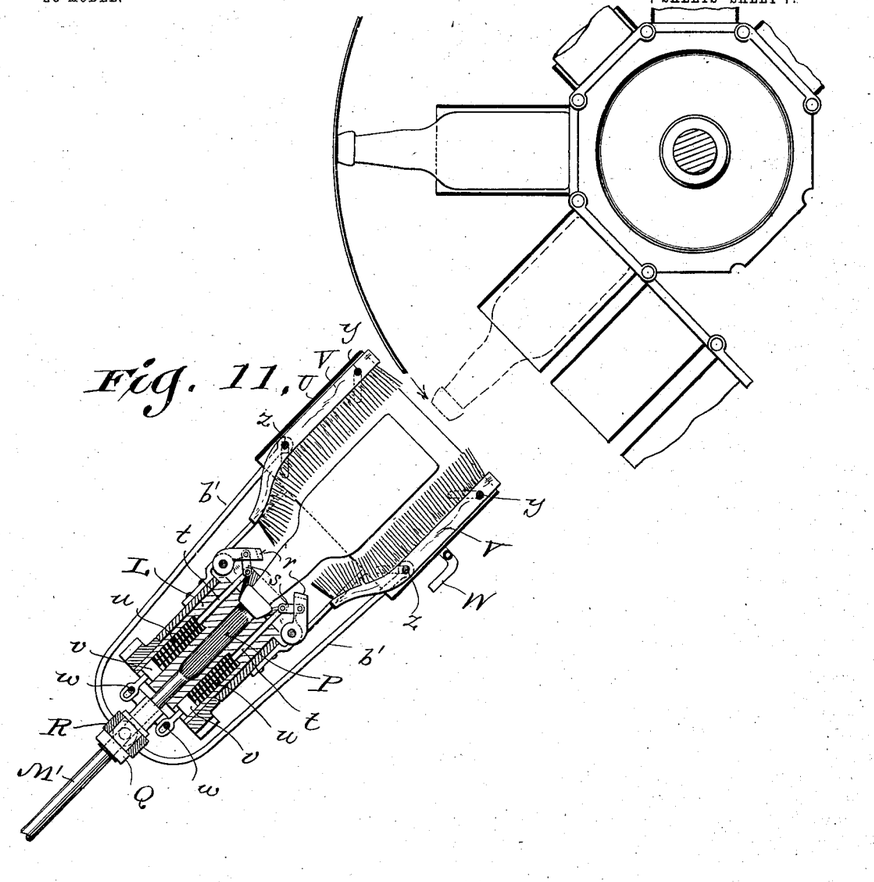
Fig. 11, a partly-sectional view of fragments of the aforesaid machine and a bottle-conveyer in juxtaposition.

As shown in Fig. 11, the machine herein set forth may be arranged and timed to receive bottles automatically discharged from a conveyer, such as is generally employed to elevate said bottles from a soak-tank, whereby considerable time and labor ordinarily employed in handling dirty bottles is saved.

Having thus described our invention, what we claim as new, and desire to secure by Letters Patent, is—

1. A bottle-washing machine comprising revolving radially-reciprocative cross-heads having bottle gripping and whirling mechanism in conjunction therewith, brushes on which the bottles are reciprocated, and means automatically controlling the gripping, whirling and release of the bottles, as well as the feed of wash-water thereto.

2. A bottle-washing machine comprising revolving radially-reciprocative cross-heads having bottle gripping, and whirling mechanism in conjunction therewith, brushes on which the bottles are reciprocated, adjustable brushes carried with the cross-heads to operate upon the exterior of the bottles, and means automatically controlling the gripping, whirling and release of the bottles as well as the adjustment of the latter brushes and the feed of wash-water to said bottles.

3. A bottle-washing machine comprising a rotatory shaft having radially-slotted spiders fast thereon, cross-heads reciprocative in the spider-slots, bottle gripping and whirling mechanism in conjunction with the cross-heads, brushes on which the bottles are reciprocated, and means automatically controlling the gripping, whirling, and release of the bottles, as well as the feed of wash-water thereto.

4. A bottle-washing machine comprising a rotatory shaft having radial slotted spiders fast thereon, cross-heads reciprocative in the spider-slots, bottle gripping and whirling mechanism in conjunction with the cross-heads, brushes on which the bottles are reciprocated, adjustable brushes carried with said cross-heads to operate upon the exterior of the bottles, and means automatically controlling the gripping, whirling and release of the bottles as well as the adjustment of the latter brushes and the feed of wash-water to said bottles.

5. A bottle-washing machine comprising a pair of radially-slotted rotatory spiders, independently-driven spindles carried by the spiders, cross-heads reciprocative in the spider-slots, rotatory bottle-gripping mechanism carried by the cross-heads in automatic clutch-controlled gear-train connection with the spindles, brushes on which the gripped bottles are reciprocated, and means automatically controlling grip and release of the bottles, as well as the feed of wash-water thereto.

6. A bottle-washing machine comprising a pair of radially-slotted rotatory spiders, independently-driven spindles carried by the spiders, cross-heads reciprocative in the spider-slots, rotatory bottle-gripping mechanism carried by the cross-heads in automatic clutch-controlled gear-train connection with the spindles, brushes on which the gripped bottles are reciprocated, adjustable brushes carried with said cross-heads to operate on the exterior of the bottles, and means automatically controlling grip and release of the bottles as well as the adjustment of the latter brushes and feed of wash-water to said bottles.

7. A bottle-washing machine comprising revolving radially-reciprocative cross-heads, having bottle gripping and whirling mechanism in conjunction therewith, brush-tipped water-distributers on which the gripping and whirling mechanism for each bottle is centrally guided, and means automatically controlling the gripping, whirling and release of the bottles, as well as the feed of water to said distributers.

8. A bottle-washing machine comprising revolving radially-reciprocative cross-heads having bottle gripping and whirling mechanism in conjunction therewith, brush-tipped water-distributers on which the gripping and whirling mechanism for each bottle is centrally guided, adjustable brushes carried with the cross-heads to operate upon the exterior of the bottles, other water-distributers in connection with some of those aforesaid arranged to discharge adjacent to the latter brushes, and means automatically controlling the gripping, whirling and release of said bottles as well as the feed of water to the several distributers.

9. A bottle-washing machine comprising a rotatory shaft having a channeled end, a water-tight fitting loose in said end of the shaft, radially-slotted spiders fast on said shaft, cross-heads reciprocative in the spider-slots, a shell in connection with one of the spiders to therewith form a water-chamber, in communication with the shaft-channel, valve-controlled horizontal pipes connected to said spiders to lead from the water-chamber and provided with right-angle brush-tipped branches, bottle gripping and whirling mechanism in conjunction with the cross-heads centered on the brush-tipped branches of the water-pipes, and means automatically controlling the gripping, whirling and release of the bottles, as well as the unseating and seating of the valves controlling said pipes.

10. A bottle-washing machine comprising a rotatory shaft having a channeled end, a water-tight fitting loose in said end of the shaft, radially-slotted spiders fast on the shaft, cross-heads reciprocative in the spider-slots, a shell in connection with one of the spiders to therewith form a water-chamber in communication with the shaft-channel, bottle gripping and whirling mechanism in conjunction with the cross-heads, brushes arranged and connected to operate upon the interior and exterior of the bottles, valve-controlled water-distributing systems that being in communication with the aforesaid chamber discharge adjacent to the brushes, and means automatically controlling gripping, whirling and release of said bottles, as well as the unseating and seating of the valves controlling the water-distributing systems.

11. A bottle-washing machine comprising standards that constitute cams and are themselves provided with cam-flanges, a rotatory shaft having its bearings in the standards, radially-slotted spiders fast on the shaft, independently-driven spindles carried by the spiders, cross-heads guided in the spider-slots and which travel the cam contour of said standards, bottle-gripping mechanism carried by the cross-heads in clutch-controlled gear-train connection with said spindles, spring-controlled levers constituting parts of the bottle-gripping mechanism arranged and connected to be actuated against spring resistance by cam-flanges of said standards, brush-tipped water-distributers on which gripped bottles are reciprocated, and means partly controlled by a cam-flange of one of the aforesaid standards to govern feed of water to said distributers.

12. A bottle-washing machine comprising standards that constitute cams and are themselves provided with cam-flanges, a rotatory shaft having its bearings in the standards, radially-slotted spiders fast on the shaft, independently-driven spindles carried by the spiders, cross-heads guided in the spider-slots and which travel the cam contour of said standards, bottle-gripping mechanism carried by the cross-heads in clutch-controlled gear-train connection with said spindles, spring-controlled levers constituting parts of the bottle-gripping mechanism arranged and connected to be actuated against spring resistance by cam-flanges of said standards, brush-tipped water-distributers on which gripped bottles are reciprocated, means partly controlled by a cam-flange of one of the aforesaid standards to govern feed of water to said distributers, frames in connection with the cross-heads, brushes adjustable in the frames, means in connection with the aforesaid levers whereby movement of the adjustable brushes is controlled, and other means governing feed of water adjacent to said brushes.

13. A bottle-washing machine comprising revolving radially-reciprocative cross-heads, cylindrical bottle-opposing blocks and a sleeve loose in each cross-head, a train of gear connecting the blocks and sleeve, a sleeve-engaging clutch member loose on an independently-driven spindle, means retarding start of the sleeve with said clutch member, another clutch member in yielding connection with the one aforesaid and having feather-and-groove connection with the spindle, jaws in pivotal connection with outer ends of the blocks, brush-tipped water-distributers engaging central apertures in said blocks, spring-and-lever controlled yoke-connected sleeves guided on the water-distributers, spring-controlled rod-and-link mechanism connected to the jaws with each rotary block and having loose-play connection with a yoke-engaging sleeve, means whereby intermittent automatic tilt of the yoke-controlling levers is had against spring resistance, and other means governing feed of water to said distributers.

14. A bottle-washing machine comprising revolving radially-reciprocative cross-heads, cylindrical bottle-opposing blocks and a sleeve loose in each cross-head, a train of gear connecting the blocks and sleeve, a sleeve-engaging clutch member loose on an independently-driven spindle; means retarding start of the sleeve with said clutch member, another clutch member in yielding connection with the one aforesaid and having feather-and-groove connection with the spindle, jaws in pivotal connection with outer ends of the blocks, brush-tipped water-distributers engaging central apertures in said blocks, spring-and-lever controlled yoke-connected sleeves guided on the water-distributers, spring-controlled rod-and-link mechanism connected to the jaws with each rotary block and having loose-play connection with a yoke-engaging sleeve, means whereby intermittent automatic tilt of the yoke-controlling levers is had against spring resistance, a frame in connection with each cross-head, brushes adjustable in the frame, means in connection with a sleeve-yoke controlling adjustment of the brushes, other water-distributers in connection with some of those aforesaid arranged to discharge adjacent to the latter brushes, and means governing feed of water to the several distributers.

In testimony that we claim the foregoing we have hereunto set our hands, at Milwaukee, in the county of Milwaukee and State of Wisconsin, in the presence of two witnesses.

ALOIS L. ROSMANN.
FERDINAND BARTHOLD.

Witnesses:
N. E. OLIPHANT,
B. C. ROLOFF.